(12) United States Patent
Davis

(10) Patent No.: US 8,132,668 B2
(45) Date of Patent: Mar. 13, 2012

(54) PACKAGING FOR ELECTRICAL COMPONENTS

(75) Inventor: Jerald Daniel Davis, La Crescenta, CA (US)

(73) Assignee: The John Henry Company, Lansing, MI (US)

( * ) Notice: Subject to any disclaimer, the term of this patent is extended or adjusted under 35 U.S.C. 154(b) by 199 days.

(21) Appl. No.: 12/349,879

(22) Filed: Jan. 7, 2009

(65) Prior Publication Data

US 2010/0170814 A1    Jul. 8, 2010

(51) Int. Cl.
*B65D 85/86* (2006.01)
*B65D 85/57* (2006.01)

(52) U.S. Cl. ............ 206/307.1; 206/312; 206/308.1

(58) Field of Classification Search .......... 206/307, 206/232, 307.1, 308.1, 311, 312, 313, 701, 206/473, 472, 484
See application file for complete search history.

(56) References Cited

U.S. PATENT DOCUMENTS

| | | | | |
|---|---|---|---|---|
| 2,077,570 A * | 4/1937 | Lamare | .................... | 229/125.37 |
| 3,567,103 A * | 3/1971 | Seifert | .................... | 206/588 |
| 3,927,767 A * | 12/1975 | Sato et al. | .................... | 206/589 |
| 5,518,488 A * | 5/1996 | Schluger | .................... | 493/82 |
| 5,749,463 A * | 5/1998 | Collins | .................... | 206/308.1 |
| 5,772,018 A * | 6/1998 | Walch | .................... | 206/308.1 |
| 6,044,969 A * | 4/2000 | Denize et al. | .................... | 206/308.1 |
| 6,092,653 A * | 7/2000 | Pozzoli | .................... | 206/312 |
| 6,360,887 B1 * | 3/2002 | Pettey | .................... | 206/232 |
| 6,604,635 B1 * | 8/2003 | Kutaragi et al. | .................... | 206/579 |
| 6,938,769 B2 * | 9/2005 | So | .................... | 206/472 |
| 7,077,265 B2 * | 7/2006 | Laarman | .................... | 206/232 |
| 2003/0111368 A1 * | 6/2003 | Wynalda et al. | .................... | 206/312 |
| 2003/0121807 A1 * | 7/2003 | Oguchi | .................... | 206/312 |

* cited by examiner

*Primary Examiner* — Steven A. Reynolds
(74) *Attorney, Agent, or Firm* — Price Heneveld LLP

(57) ABSTRACT

A package made from a biodegradable material, such as paperboard, utilizes multi-layered sheets of relatively thin material which can be cut to desired shapes relatively inexpensively and folded into adjacent layers which are adhesively attached to one another to form the package. In a preferred embodiment of the invention, the package defines a book-like package having an outer envelope with one side defining a sleeve for receiving a disk and an opposite side which receives a laminated multi-layered holder having a pocket in the shape of a memory chip/card or other electronic component to be held therein.

12 Claims, 6 Drawing Sheets

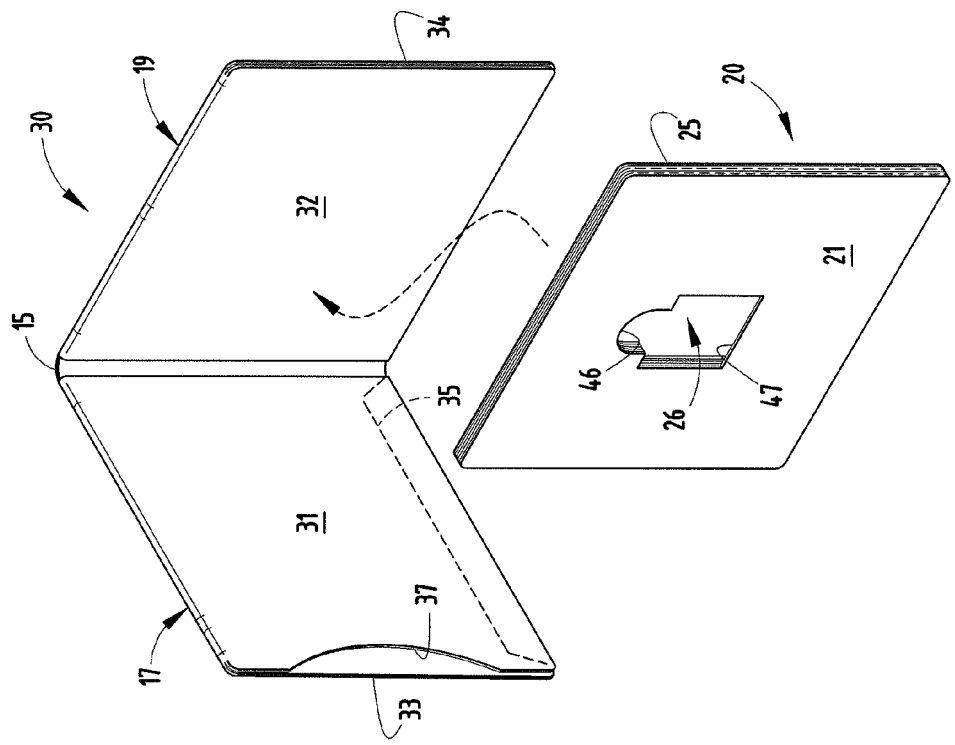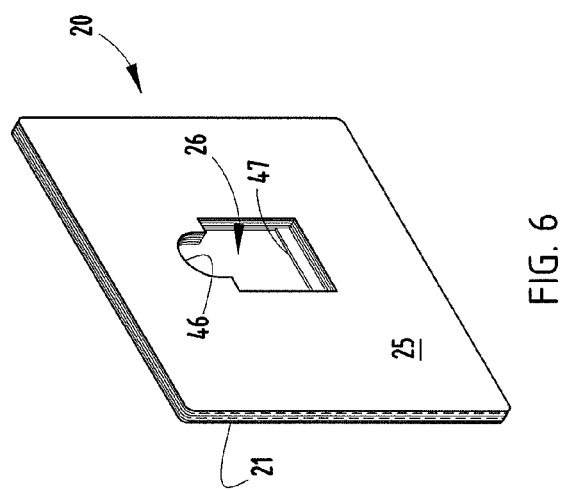

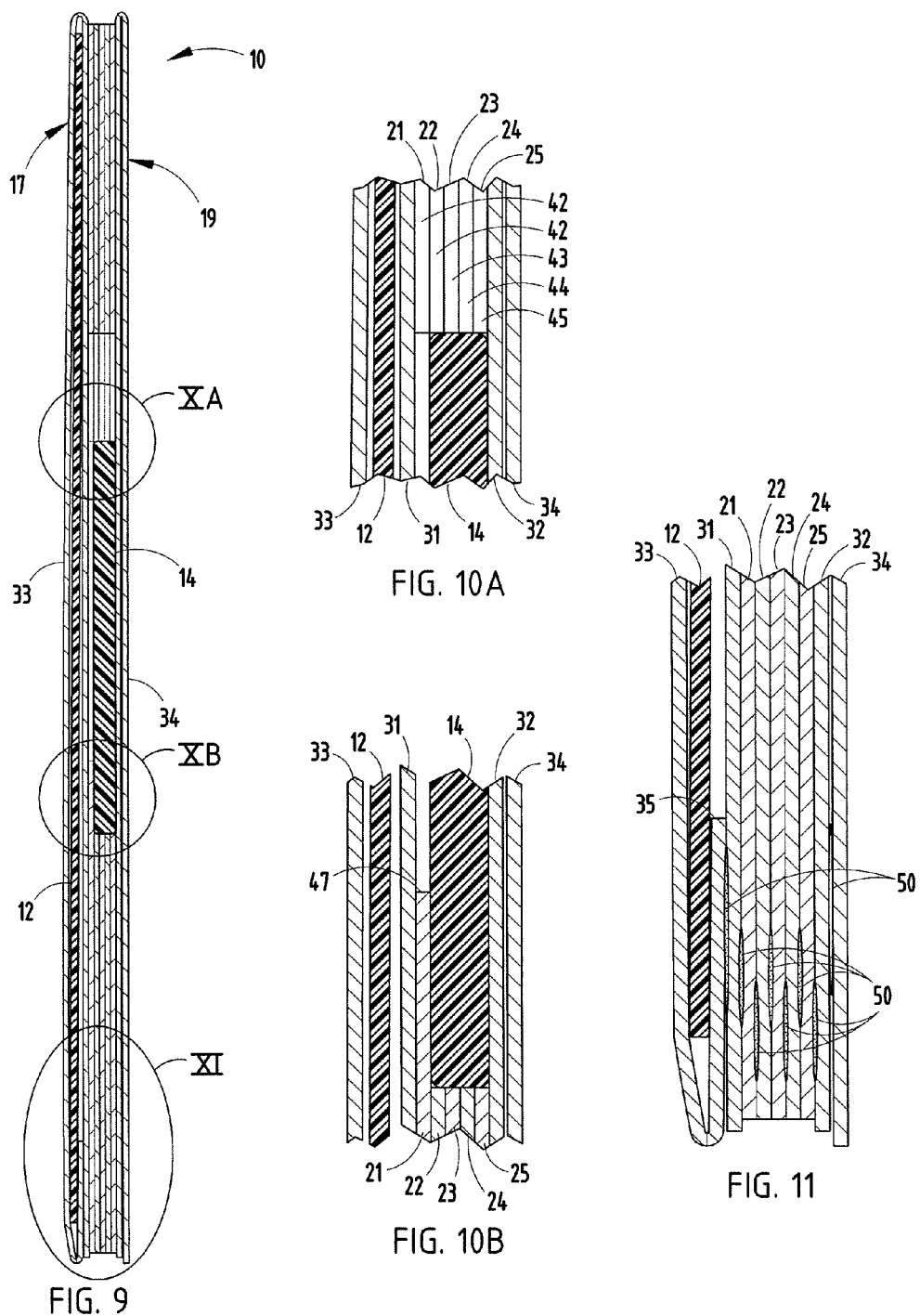

PACKAGING FOR ELECTRICAL COMPONENTS

BACKGROUND OF THE INVENTION

The present invention relates to an eco-friendly package made of biodegradable materials for electrical components, such as memory chips.

Packaging for computer software and, particularly, relatively expensive software used, for example, for computer programs and computer games, including game chips and CDs or DVDs associated with the programs and/or games are typically polymeric containers made of polystyrene or other polymeric material which is not biodegradable. Upon opening of the package and removal and use of the computer software, frequently the packaging is discarded and becomes part of the ecological problem with non-biodegradable waste.

One of the reasons computer software in the form of, for example, game chips have been packaged in polymeric material is the thickness of the chip itself and the need to nest it within a protective package. The cost of molding a polymeric package has been relatively inexpensive and, therefore, without considering environmental factors, the polymeric packaging has been the preferred packaging system for such computer software. As the number of users of computer software increases, so too does the amount of non-biodegradable packaging which becomes of greater concern. There exists a need in the growing market of computer software to consider alternative packaging that does not result in non-biodegradable waste and the concomitant increase in long term environmental problems.

SUMMARY OF THE INVENTION

The packaging of the present invention solves this need by providing a package made from a biodegradable material, such as paperboard, which can satisfy the strict requirements of computer software packaging, including providing suitable depth of a protective package for computer memory chips or the like, which contain software or data. The packaging is suitable, therefore, for memory chips, computer software, program chips such as game chips, or other electrical components which typically have been protected in non-biodegradable plastic packaging.

The system of the present invention provides such packaging by utilizing multi-layered sheets of relatively thin material which can be cut to desired shapes relatively inexpensively and folded into adjacent layers which are adhesively attached to one another to form the package. In a preferred embodiment of the invention, the package defines a book-like package having an outer envelope. One side of the envelope may define a sleeve for receiving a disk and an opposite side receives a laminated multi-layered holder having a pocket in the shape of a memory chip or other electronic component to be held therein. The outermost layer of the holder has a slightly smaller open area to define a ledge for holding the electronic component in position within the pocket defined by the holder. In a preferred embodiment of the invention, the package is made of paperboard with the outer envelope comprising a generally rectangular member which is folded to define an outer jacket of the book-like package while the holder section likewise is an elongated, rectangular member which is accordion-folded with mating and aligned die cuts to define a central pocket for receiving and holding an electronic component.

These and other features, objects and advantages of the present invention will become apparent upon reading the following description thereof together with reference to the accompanying drawings.

BRIEF DESCRIPTION OF THE DRAWINGS

FIG. 6 is a rear perspective view of the holder section once laminated;

FIG. 7 is a perspective view showing the mounting of the holder section to an inner side of the envelope;

FIG. 9 is an enlarged cross-sectional view taken along section line IX-IX of FIG. 1;

FIG. 10 is an enlarged view of the circled area X in FIG. 9; and

FIG. 11 is an enlarged view of the circled area XI shown in FIG. 9.

DETAILED DESCRIPTION OF THE PREFERRED EMBODIMENT

Figure 2:
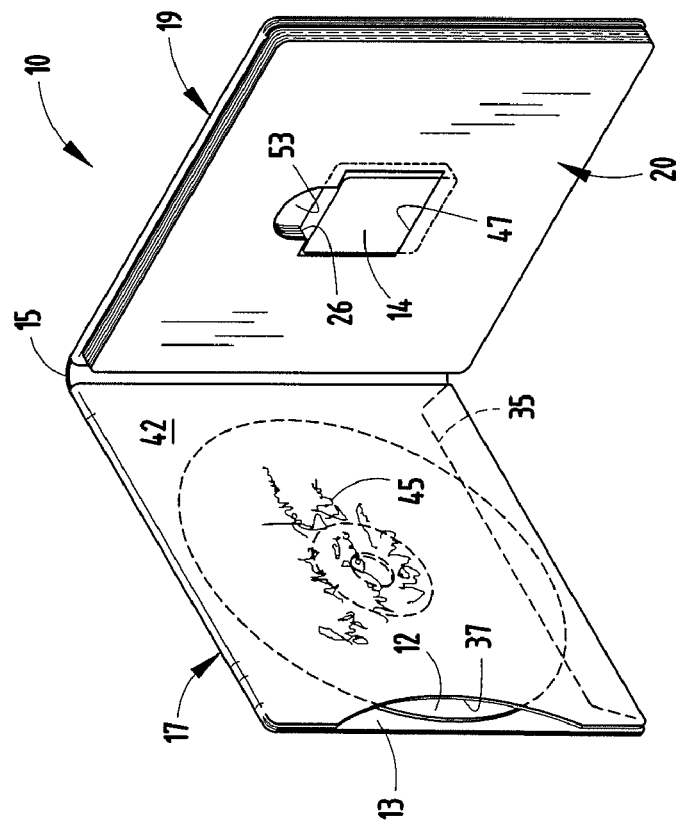
FIG. 2 is a perspective view of the package shown in FIG. 1, shown with the book-like package open for access to the components contained therein.
Figure 1:
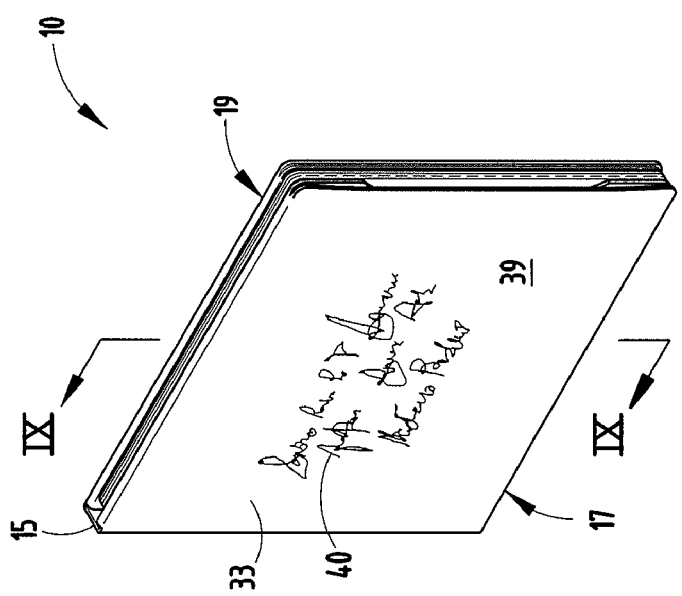
FIG. 1 is a perspective view of a book-like package embodying the present invention, shown in a closed position.

Referring initially to FIGS. 1 and 2, there is shown a package 10 for holding electrical components, including, for example, storage media, such as a disk 12 (FIG. 2) and memory chip or card 14. The package is a book-like package which opens, as shown in FIG. 2, along an integrally formed hinge 15 extending between one side 17 and the opposite side 19 of package 10. Side 17 defines a sleeve 13 for receiving disk 12, as described in greater detail below, while the opposite side 19 there is attached a relatively deep holder 20 with a pocket 26 formed therein for receiving chip 14.

Figure 4:
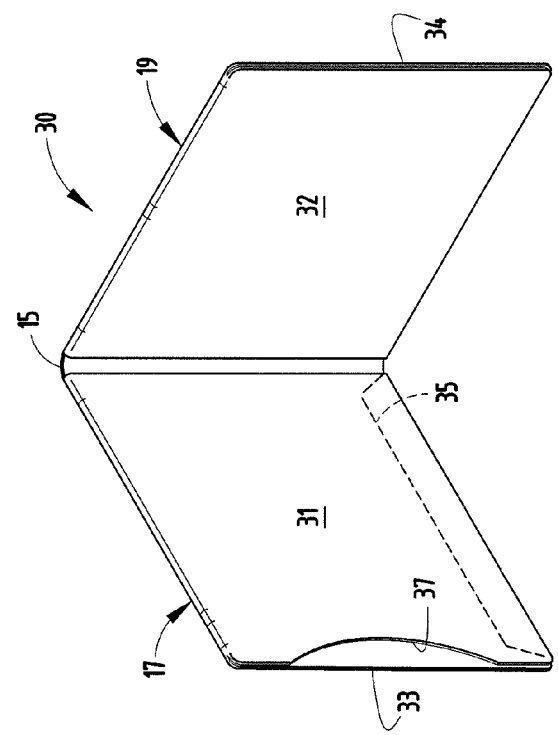
FIG. 4 is a perspective view of the outer envelope, shown in its folded and laminated condition.
Figure 3:
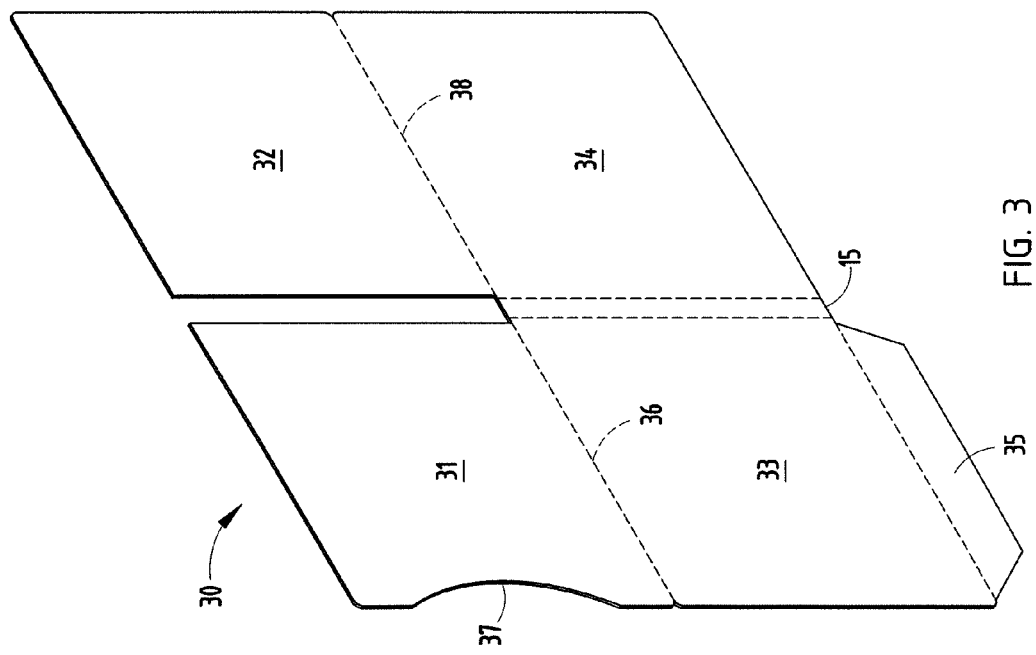
FIG. 3 is a perspective view of the outer envelope of the package prior to folding.

The package is basically formed from two components comprising an outer envelope 30 (FIG. 3), which is folded, as seen in FIG. 4, to define sides 17 and 19 of the book-like package 10, and the holder 20 (FIGS. 5 and 6), which is folded and laminated to form the chip-holding pocket 26. Envelope 30 is formed of a single piece of material, such as paperboard, and, in one preferred embodiment, the 24 point (0.024 inch) board was a standard solid bleached sulfate paperboard clay coated on one side (C1S SBS). Envelope 30 is die cut to include four panels 31-34 and a flap 35. Outer envelope 30 is formed by folding flap 35 over panel 33 and providing an adhesive to the outer surface of flap 35. Next, panel 31 is folded over panel 33 along fold line 36 and adhesively attached to flap 35 to define the pocket 13. Panel 31 includes a recess 37 to provide a finger grip for ease of removal of the disk 12 as seen in FIG. 2. Opposite side 19 of envelope 30 is formed by folding panel 32 over panel 34 at fold line 38 and adhesively gluing the facing surfaces of panels 32 and 34 together. The adhesive 50 (FIG. 11) can be any type of commercially available adhesive, such as an emulsion, copolymer resin type of adhesive, having suitable adhesive properties.

Other commercially available adhesives, including contact adhesives used in bonding paperboard, can likewise be employed.

The outer surface 39 of panel 33 is exposed, as shown in FIG. 1, and may include printed indicia 40 thereon including, for example, graphic illustrations of the software on disk 12 and/or chip 14, instructions for use of the game, and the like. When a computer game is involved, typically indicia 40 will include graphics illustrating the nature of the game and components thereof, graphics or trademarks identifying the supplier of the game or other information relating to the content contained on disk 12 and chip 14. Similarly, the remaining exposed surfaces of package 10, such as surface 42 on the inside front cover 17, may include printed indicia 45 comprising graphics, instructions, or the like relating to the content of the packaged items.

Figure 5:
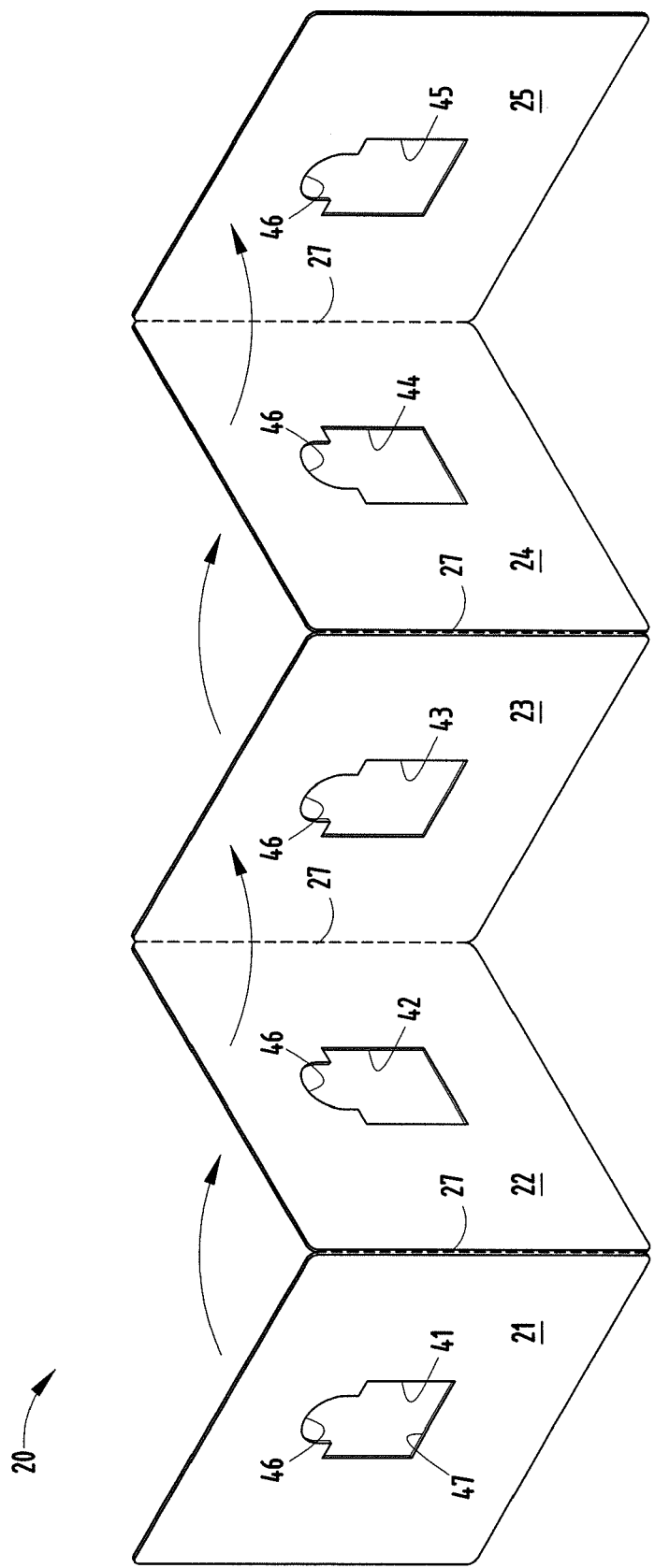
FIG. 5 is a perspective view of the multiple panel holder section.

The outer envelope 30 receives the holder 20 which is made from laminated panels 21-25, as best seen in FIGS. 5 and 6. In one preferred embodiment, the holder 20 was made from five panels 21-25 coupled to one another by breakaway fold lines 27 between adjacent panels. Panel 21 has a first die cut or aperture 41 with a height slightly smaller than the apertures 42-45 in the remaining panels. Each of the apertures 41-45 are generally rectangular with a semicircular dome 46 defining a finger hold 53 (FIG. 2) for removal of chip 14 from the pocket 26 formed by the holder 20. The lower edge of aperture 41 defines a ledge 47, as best seen in the rear view of FIG. 6, for holding chip 14 in place within pocket 26. Each of the remaining panels 22, 23, 24 and 25 also include die cut apertures 42, 43, 44, and 45. Each of the apertures 42-45 are similar in shape to aperture 41 except that they have a greater height in the rectangular section to define the pocket behind ledge 47. Apertures 41-45 are preferably die cut through the paperboard which is of the same type and thickness as that used for the envelope 30 and the fold lines 27 are perforated to allow easy folding and maintain the apertures 41-45 in alignment with one another during assembly of the cut pattern shown in FIG. 5 into the holder shown in FIG. 6. The facing surfaces of each of the panels 21-25 have an adhesive 50 (FIG. 1) applied thereto such that they are laminated, as seen in FIGS. 6 and 7, when folded together to create holder 20 with a relatively deep pocket 26 to accommodate the depth of chip 14. Depending on the thickness of the component t be held within pocket 26, the number of panels forming holder 20 can be increased or decreased. Five panels of 24 point paperboard was employed to package a Nintendo® DS game chip.

Figure 8:
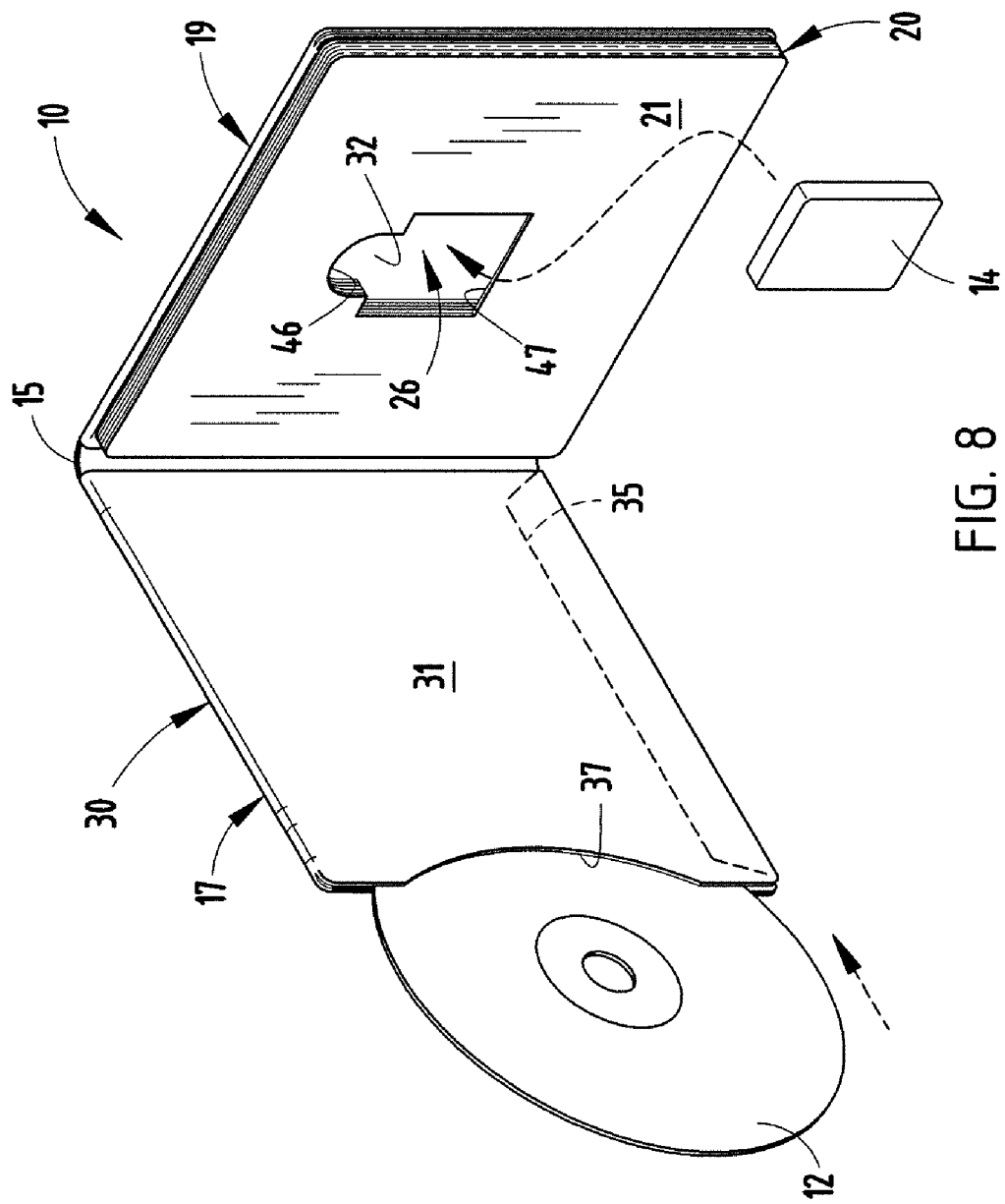
FIG. 8 is a perspective view of the completed package, showing the insertion of a disk and a computer chip within the sleeve and pocket of the package.

Subsequently, the rearmost panel 25 of holder 20 is attached to surface 32 of envelope 30, as seen in FIG. 7, with an adhesive. Once the surface of panel 25 is adhered to the facing surface of panel 32 of envelope 30, the package is completed and disk 12 can be inserted in the sleeve 13 and computer memory chip 14 can be inserted into pocket 26 as illustrated in FIG. 8. The facing surface of panel 32 forms the rear wall of pocket 26, while the thickness of the laminate made of panels, such as panels 21-25, defines the depth of pocket 26 to accommodate chip 14. The layers of panels and the adhesive 50 employed for bonding the layers together is illustrated in FIGS. 9-11, which also illustrate the position of disk 12 in the sleeve between panels 31 and 33 and the chip 14 in the pocket 26 between ledge 47 and the rear wall defined by panel 32. The package 10 and the shape of pocket 26 can be varied to accommodate different sized memory or game cards or chips, such as secure digital (SD), compact flash (CF) memory sticks and the like. The package can be formed to house other relatively small but expensive electrical components, such as RAM memory, CPU's and the like.

It will become apparent to those skilled in the art that various modifications to the preferred embodiment of the invention as described herein can be made without departing from the spirit or scope of the invention as defined by the appended claims.

The invention claimed is:

1. A book-like package holding a computer disk and separately holding a computer chip comprising:
    a jacket having first and second sides folded along a center line, said jacket made of a biodegradable material, wherein one side of said jacket includes a sleeve defined by two layers of material for holding a computer disk therein;
    a computer disk inserted into said sleeve;
    a holder made of a plurality of accordion-folded laminated layers of biodegradable panels of material, said holder mounted to a side of said jacket opposite said one side and wherein each layer of material includes a cutout which aligns with adjacent layers when folded to define a pocket having a thickness allowing the holding of an electrical computer chip inserted into said pocket; and
    a computer chip inserted into said pocket.

2. The package as defined in claim 1 wherein said pocket is generally rectangular for holding said computer chip.

3. The package as defined in claim 1 wherein an outer layer of material forming said holder has a cutout aperture of smaller dimension than the remaining layers to define a ledge for holding said computer chip in said pocket.

4. The package as defined in claim 3 wherein said biodegradable material is paperboard.

5. The package as defined in claim 4 wherein said jacket has an outer surface and indicia is printed on said outer surface.

6. The package as defined in claim 1 wherein said pocket is formed of die cuts through each layer of said laminated holder.

7. The package as defined in claim 1 wherein said pocket includes a curved edge defining a finger access recess to facilitate removal of said computer chip from said pocket.

8. A package holding a computer disk and a memory chip comprising:
    a jacket having first and second sides joined by an integral hinge, said jacket made of a biodegradable material wherein one side defines a sleeve for holding a computer disk;
    a computer disk inserted into said sleeve;
    a laminated holder made of at least five layers of accordion-folded panels made of a biodegradable material adhered in overlapping relationship to one another by an adhesive, said holder mounted to an opposite side of said jacket facing said sleeve and including a die cut pocket for the insertion and holding of a computer memory chip therein, wherein one panel remote from said opposite side of said jacket has a die cut of smaller dimension in the remaining panels to define a ledge for holding a chip in said pocket; and
    a computer memory chip inserted into said pocket.

9. The package as defined in claim 8 wherein said pocket is generally rectangular for holding said computer memory chip.

10. The package as defined in claim 8 wherein said die cut pocket of said holder includes a curved cutout at one edge to allow finger access for removal of said computer memory chip positioned in said pocket and wherein said holder is mounted to said jacket on a side opposite said sleeve.

11. The package as defined in claim 10 wherein said biodegradable material is paperboard.

12. The package as defined in claim 8 wherein said jacket is formed from at least three panels and said sleeve is defined by two spaced-apart panels.

* * * * *